US012607862B2

(12) United States Patent
Park et al.

(10) Patent No.: US 12,607,862 B2
(45) Date of Patent: Apr. 21, 2026

(54) LENS HOLDER, OPTICAL MODULE INCLUDING THE SAME, AND GLASSES-TYPE AUGMENTED REALITY PROVISION DEVICE

(71) Applicant: LETINAR CO., LTD, Anyang-si (KR)

(72) Inventors: Young Su Park, Hwaseong-si (KR);
Jae Min Kim, Seoul (KR)

(73) Assignee: LETINAR CO., LTD, Anyang-si (KR)

( * ) Notice: Subject to any disclaimer, the term of this patent is extended or adjusted under 35 U.S.C. 154(b) by 346 days.

(21) Appl. No.: 18/464,673

(22) Filed: Sep. 11, 2023

(65) Prior Publication Data

US 2024/0176153 A1     May 30, 2024

(30) Foreign Application Priority Data

Nov. 25, 2022     (KR) ........................ 10-2022-0160347
Mar. 9, 2023     (KR) ........................ 10-2023-0031244

(51) Int. Cl.
*G02B 27/00*     (2006.01)
*G02B 27/01*     (2006.01)

(52) U.S. Cl.
CPC .. *G02B 27/0176* (2013.01); *G02B 2027/0178* (2013.01)

(58) Field of Classification Search
CPC ........ G02B 27/0176; G02B 2027/0178; G02B 27/0006; G02B 27/01; G02B 27/0172; G02C 9/00; G02C 9/04; G02C 2200/02
USPC .......................................................... 351/57
See application file for complete search history.

(56) References Cited

U.S. PATENT DOCUMENTS 4,751,691 A  *  6/1988  Perera ................ G02B 27/0172
                                                     968/398
2021/0173213 A1*  6/2021  Ricks ................... G02B 7/1805

FOREIGN PATENT DOCUMENTS

CN          208110168 U      11/2018
CN          112255801 A       1/2021
CN          217718272 U      11/2022
KR    10-2020-0102904 A       9/2020

* cited by examiner

*Primary Examiner* — Henry Duong
(74) *Attorney, Agent, or Firm* — Rabin & Berdo, P.C.

(57) ABSTRACT

Disclosed herein are a lens holder, an optical module including the lens holder, and a glasses-type augmented reality provision device. According to an embodiment of the present invention, there is provided a lens holder including: frames configured to be coupled to a lens and fix the lens; and a display unit holder fixing part configured to be connected to the frames and accommodate a display unit holder.

25 Claims, 15 Drawing Sheets

LENS HOLDER, OPTICAL MODULE INCLUDING THE SAME, AND GLASSES-TYPE AUGMENTED REALITY PROVISION DEVICE

CROSS-REFERENCE TO RELATED APPLICATION

This application claims the benefit of Korean Patent Applications No. 10-2022-0160347 filed on Nov. 25, 2022 and No. 10-2023-0031244 filed on Mar. 9, 2023, which are hereby incorporated by reference herein in its entirety.

BACKGROUND

1. Technical Field

The present invention relates to a lens holder, an optical module including the lens holder, and a glasses-type augmented reality provision device, and more particularly, to a lens holder capable of increasing manufacturing convenience and minimizing tolerance during assembly, thereby significantly lowering the defect rate of products, and an optical module including the lens holder and a glasses-type augmented reality provision device.

2. Description of the Related Art

In order to implement augmented reality (AR) or virtual reality (VR), there is required an optical system for transferring virtual images to be played back in a device such as a computer to the eyes of a user.

For example, an optical system for augmented reality generally includes an optical module including: a display unit configured to output virtual image light; and lenses each configured such that an optical element for transferring the virtual image light, output from the display unit, to the eyes of a user is disposed therein and also configured to transmit image light from external real objects therethrough to the eyes.

Since the optical module is configured to transfer virtual image light, output from the small display unit, to the eyes of a user, it has to be assembled considerably precisely. In particular, the coupling between the display unit and the lenses in which the optical element is disposed requires considerably high precision. In particular, in the case of a binocular optical module, the position of the display unit changes excessively out of a design position when the cumulative tolerance of the left and right lenses occurs, which causes dipvergence and convergence defects.

However, in the prior art, when the display unit is coupled to the lenses, the method of simply attaching the display unit to required positions of the lenses and then applying an adhesive is employed, so that there are problems in that assembling process is difficult and the defect rate of products is significantly high.

SUMMARY

The present invention has been conceived to overcome the above-described problems, and an object of the present invention is to provide a lens holder capable of increasing the manufacturing convenience of an optical module used in augmented reality or virtual reality and minimizing tolerance during assembly, and an optical module including the lens holder.

In particular, another object of the present invention is to provide a lens holder capable of efficiently preventing dipvergence and convergence problems that may occur in a binocular optical module, and an optical module including the lens holder.

Another object of the present invention is to provide a lens holder having a foreign material blocking function capable of effectively blocking the inflow of a foreign material such as dust, and an optical module including the lens holder.

Still another object of the present invention is to provide a glasses-type augmented reality provision device including such an optical module.

According to an aspect of the present invention, there is provided a lens holder including: frames configured to be coupled to a lens and fix the lens; and a display unit holder fixing part configured to be connected to the frames and accommodate a display unit holder.

The frames may be coupled to at least a portion of the outer circumferential surface of the lens and fix the lens.

The frames may include first and second frames extending in opposite directions along the outer circumferential surface of the lens with the display unit holder fixing part as the center thereof.

The frames may be provided with at least one recess configured to be fitted over a protrusion formed on the lens.

The display unit holder may be accommodated and fixed in the display unit holder fixing part in a state in which a display unit is disposed in the display unit holder.

A gap may be formed between the display unit holder fixing part and the display unit holder so that the display unit holder can be moved or rotated within the display unit holder fixing part.

In an embodiment, a holder opening configured such that virtual image light output from the display unit passes therethrough may be formed in the display unit holder; and an opening configured such that virtual image light output from the display unit and having passed through the holder opening of the display unit holder passes therethrough may be formed in the display unit holder fixing unit.

According to another aspect of the present invention, there is provided a lens holder including: frames configured to be coupled to a lens and fix the lens; and a display unit holder fixing part configured to be connected to the frames and accommodate a display unit holder; wherein the display unit holder fixing part has a foreign material accommodation portion configured to accommodate a foreign material incoming from the outside; and wherein the foreign material accommodation portion includes at least one of an inner groove formed in the bottom surface of the display unit holder fixing part and outer grooves formed in the lateral sides of the display unit holder fixing part.

The frames may be coupled to at least a portion of the outer circumferential surface of the lens and fix the lens.

The frames may include first and second frames extending in opposite directions along the outer circumferential surface of the lens with the display unit holder fixing part as the center thereof.

The frames may be provided with at least one recess configured to be fitted over a protrusion formed on the lens.

The display unit holder may be accommodated and fixed in the display unit holder fixing part in a state in which a display unit is disposed in the display unit holder.

A gap may be formed between the display unit holder fixing part and the display unit holder so that the display unit holder can be moved or rotated within the display unit holder fixing part.

In an embodiment, a holder opening configured such that virtual image light output from the display unit passes therethrough may be formed in the display unit holder; an opening configured such that virtual image light output from the display unit and having passed through the holder opening of the display unit holder passes therethrough may be formed in the display unit holder fixing unit; and the inner groove may be formed in the outer edges of the opening.

Front and rear edge portions may be formed along the outer edges of front and rear sides of the opening of the display unit holder fixing part; support plates may be formed spaced apart from the front and rear edge portions outside the front and rear edge portions; and the inner groove may be defined by the support plates, the front and rear edge portions, and the bottom surface of the display unit holder fixing part.

Accommodation plates extending to have an inclination angle with respect to a direction in which the support plates protrude may be disposed outside the support plates.

Sticking members configured to stick to a foreign material may be applied to bottom surfaces of the accommodation plates.

Side edge portions may be formed at the outer edges of lateral sides of the opening; side walls may be formed spaced apart from the side edge portions outside the side edge portions; and the inner groove may be defined by the side walls, the side edge portions, and the bottom surface of the display unit holder fixing part.

Blocking plates configured to protrude downward from the bottom surface of the display unit holder and to change the direction in which a foreign material incoming from the outside moves and guide it to the inner groove may be formed on the bottom surface of the display unit holder.

The blocking plates may be formed such that, when the display unit holder is disposed in the display unit holder fixing part, the outer surfaces of the blocking plates are located aligned with the outer surfaces of the side edge portions or are located closer to the opening than the outer surfaces of the side edge portions.

The outer grooves may extend along lateral sides of the display unit holder fixing part, and may each be defined by two side walls spaced apart from each other.

The cross sections of the inner surfaces of the two side walls beside the outer groove may be inclined toward the inside of the outer groove to appear like a "V" shape.

A sticking member configured to stick to a foreign material may be applied to at least one of the bottom surface of the inner groove and the bottom surfaces of the outer grooves.

According to still another aspect of the present invention, there is provided an optical module including: the above-described lens holder; a display unit holder configured to be accommodated and fixed in the lens holder and support a display unit; the display unit configured to be disposed and supported in the display unit holder and output virtual image light; and a lens configured to transfer real object image light, output from a real object, to an eye of a user by transmitting the real object image light therethrough, and also configured such that an optical element for transferring virtual image light, output from the display unit, to the eye of the user is disposed therein.

At least one protrusion may be formed on at least a portion of the outer circumferential surface of the lens.

At least one concave portion in the form of a recess may be formed in at least a portion of the outer circumferential surface of the lens.

The display unit holder fixing part may be formed in the lens holder so that the width of the display unit in the left-right direction at least partially overlaps the width of the area, where the optical element is disposed, in the left-right direction.

The display unit holder fixing part may be formed in the lens holder so that a vertical line passing through the center of the region where the optical element is disposed coincides with the vertical line passing through the center of the display unit holder fixing part.

According to still another aspect of the present invention, there is provided a binocular optical module including: an optical module for the left eye and an optical module for the right eye each composed of the above-described optical module; and an edge part configured to fix the optical module for the left eye and the optical module for the right eye.

Each of the display unit holder fixing parts may be disposed in a corresponding one of the lens holders such that a vertical line passing through the center of the display unit holder fixing part is located inward from a vertical line passing through the center of the region where a corresponding one of the optical elements is disposed.

According to still another aspect of the present invention, there is provided a glasses-type augmented reality provision device including: the above-described optical modules; a frame part configured to fix the optical modules; and fixation parts configured to be coupled to the frame part and fix the glasses-type augmented reality provision device so that the glasses-type augmented reality provision device can be worn on the face of a user.

According to still another aspect of the present invention, there is provided a glasses-type augmented reality provision device including: the above-described binocular optical module; a frame part configured to fix the binocular optical module; and fixation parts configured to be coupled to the frame part and fix the glasses-type augmented reality provision device so that the glasses-type augmented reality provision device can be worn on a face of a user.

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION

Figure 1:
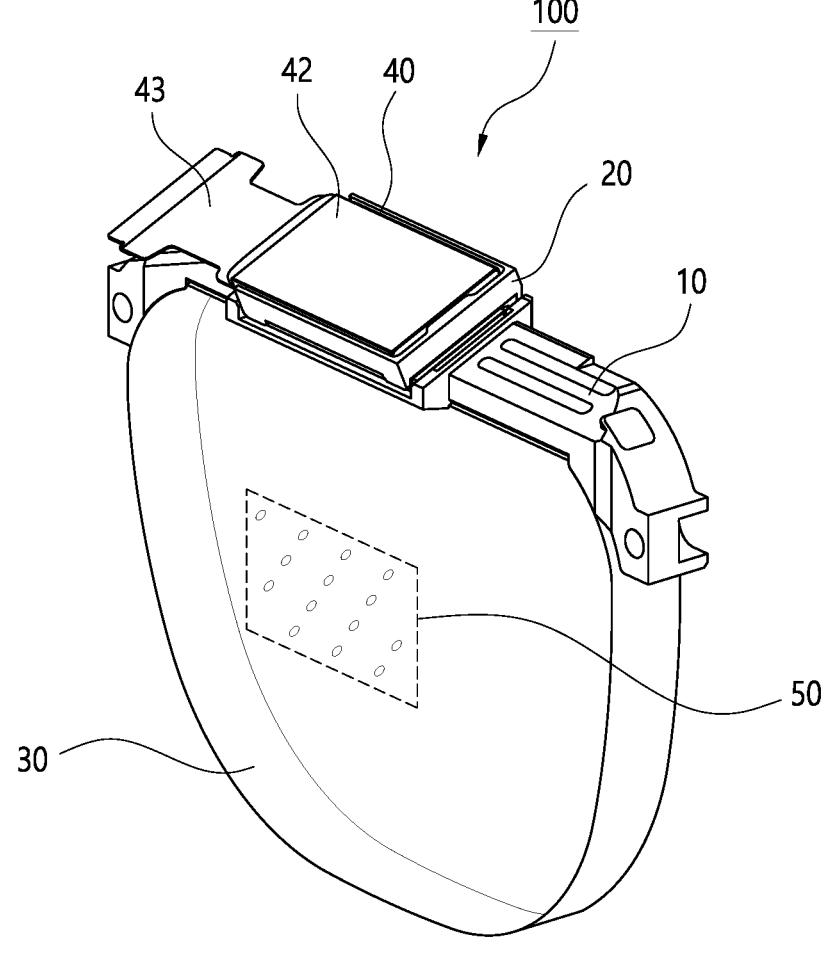
FIGS. 1 to 4 are perspective, exploded perspective, front, and side views of an optical module including a lens holder according to the present invention, respectively.
Figure 2:
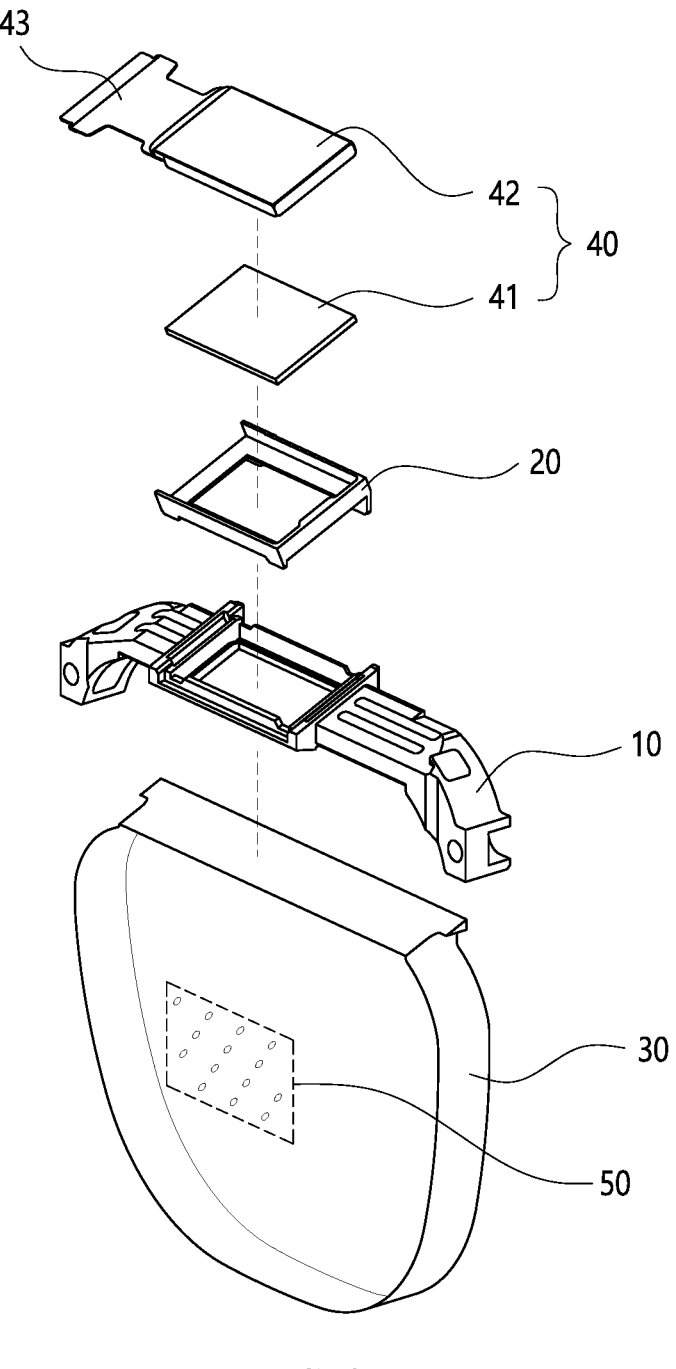

Embodiments of the present invention will be described in detail below with reference to the accompanying drawings.

First, an optical module 100 including a lens holder according to an embodiment of the present invention will be described with reference to FIGS. 1 to 4.

FIGS. 1 to 4 are perspective, exploded perspective, front, and side views of the optical module 100 including a lens holder according to the present embodiment, respectively. Referring to FIGS. 1 to 4, the optical module 100 includes a lens holder 10, a display unit holder 20, a lens 30, and a display unit 40.

Figure 16:
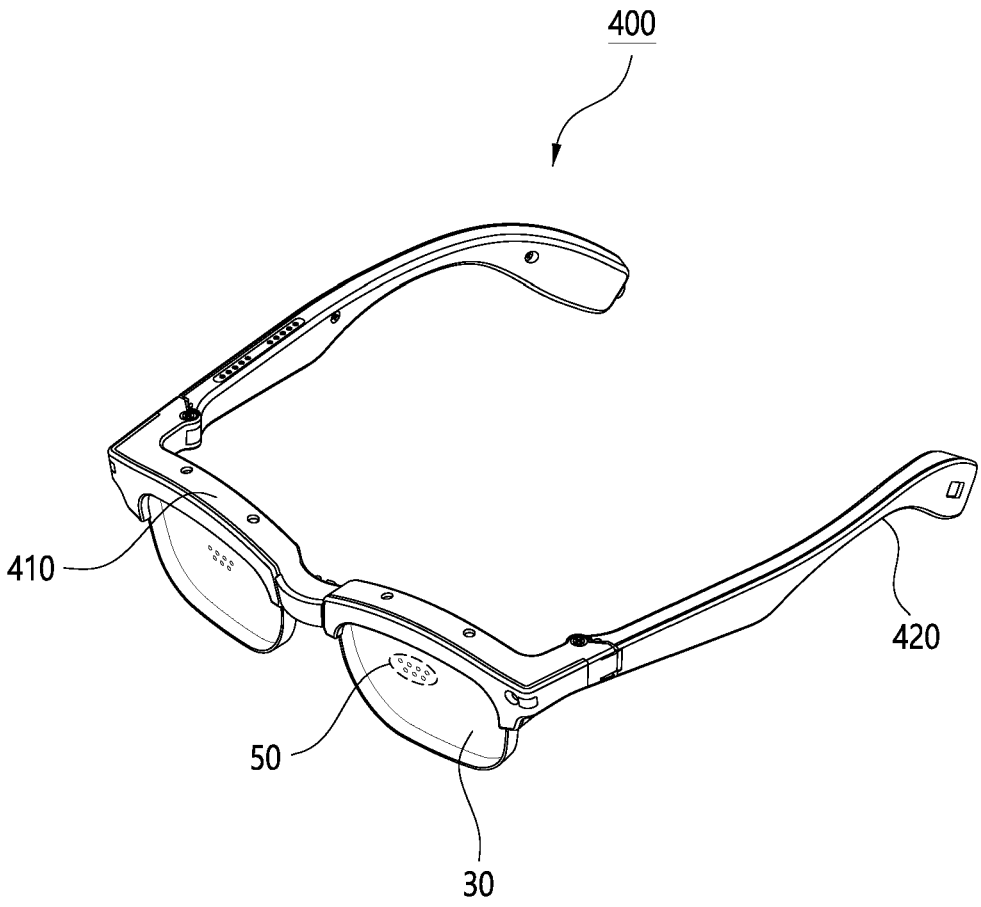
FIGS. 16 and 17 are perspective and front views of a glasses-type augmented reality provision device implemented in the form of smart glasses according to an embodiment of the present invention, respectively.
Figure 17:
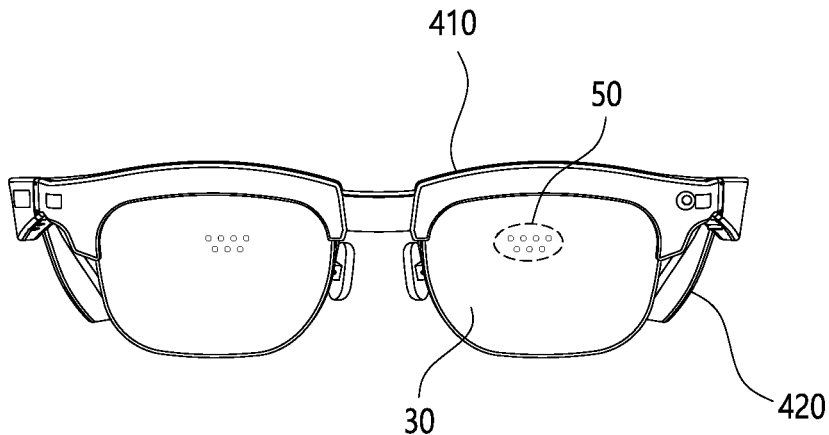

The optical module 100 is fabricated in the form shown in FIGS. 1 to 4, and is assembled together with other parts to fabricate a glasses-type augmented reality provision device, such as so-called "smart glasses," in the form of eye glasses (see FIGS. 16 and 17).

For example, by embedding the optical module 100, i.e., the lens holder 10, the display unit holder 20, and the display unit 40 inside a glasses frame, a glasses-type augmented reality provision device in the form of smart glasses can be fabricated.

Furthermore, the lens holder 10 itself may be formed as a rim.

Furthermore, the optical module 100 may be used in a form that can be selectively attached to and detached from, for example, conventional glasses by an appropriate detachable fastening means.

Although the optical module 100 of FIGS. 1 to 4 is monocular for either the left eye or the right eye, it may also be possible to construct a binocular optical module 300 (see FIG. 15) for binocular purposes by arranging such optical modules 100 for the left and right eyes, respectively. The binocular optical module 300 will be described in detail below with reference to FIG. 15.

The lens holder 10 is coupled to the lens 30 and fixes the lens 30, and is coupled to the display unit holder 20 and supports the display unit 40. The specific configuration of the lens holder 10 will be described in more detail below with reference to FIG. 5.

As will be described later, the display unit holder 20 is accommodated and fixed in the display unit holder fixing part 13 of the lens holder 10 and serves to support the display unit 40.

The lens 30 serves to transfer real object image light, output from a real object, to an eye of a user by transmitting it therethrough.

Furthermore, an optical element 50 is disposed in the lens 30, and the virtual image light output from the display unit 40 propagates through the lens 30 and is transferred to the optical element 50. Accordingly, the lens 30 serves as a waveguide for virtual image light.

The lens 30 may be made of, e.g., transparent glass or synthetic resin material.

The optical element 50 is disposed in the lens 30, and is a means for providing a virtual image by transferring virtual image light, output from the display unit 40, to an eye of a user.

The optical element 50 may be, e.g., a reflective element that reflects incident virtual image light.

In this case, the reflective element may be a full mirror having a reflectance of 100% or a high reflectance close to 100%.

Alternatively, the reflective element may be a half mirror that transmits part of incident virtual image light therethrough and reflects part of the incident virtual image light.

Alternatively, the optical element 50 may be a refractive element or a diffractive element.

Alternatively, the optical element 50 may be composed of a combination of at least one of a reflective element, a refractive element, and a diffractive element.

The optical element 50 may be composed of a plurality of reflective elements each having a size smaller than a human pupil, e.g., 4 mm or less, as shown in the drawing.

Although the optical element 50 is shown as being embedded inside the lens 30 in FIGS. 1 to 4, this is an example. The optical element 50 may be disposed on a surface of the lens 30.

Meanwhile, the optical element 50 may be composed of a plurality of bar-shaped reflective elements each extending over a length corresponding to the left-right widthwise direction of the display unit 40.

Meanwhile, the configurations and arrangement structures of the lens 30 and the optical element 50 are examples. It should be noted that the lens holder 10 according to the present invention may be applied to any configurations and arrangement of the lens 30 and the optical element 50 regardless of the specific configurations and arrangement structures of the lens 30 and the optical element 50.

The display unit 40 is a means for outputting virtual image light, and is disposed in the display unit holder 20 and supported by the display unit holder 20.

The display unit 40 may include a display cover 41 and a display 42.

The display cover 41 is a means for protecting the surface of the display 42, and may be made of, e.g., transparent thin glass or synthetic resin material.

The display 42 is a means for displaying virtual image on a screen and outputting virtual image light corresponding to the virtual image. The display 42 may be a conventionally known device such as a small sized LCD, OLED, LCOS, or micro-LED display.

A cable 43 for transferring power and image signals is connected to the display 42.

In this case, "virtual image" refers to an image for augmented reality provided to a user, which may be a still image or moving image.

Although not shown, the display unit 40 may further include a light conversion unit such as a concave mirror that enlarges and outputs a virtual image to meet design requirements such as an intended optical path or focal length or a collimator that converts incident light into parallel light and outputs the parallel light. The light conversion unit may also be composed of a reflective element, a refractive element, a diffractive element, or a combination of at least one of them according to design requirements.

Meanwhile, the display cover 41 may be omitted.

Since the display unit 40 itself is not a direct target of the present invention and a display known in the prior art may be employed as the display unit 40 without essential change, a detailed description thereof will be omitted.

This optical module 100 operates as follows:

The virtual image light output from the display 42 passes through the holder opening 21 of the display unit holder 20 and the opening 131 of the lens holder 10 to be described later, is then transferred to the lens 30, and is finally transferred to the pupil of an eye of a user, for example, by being reflected or refracted via the optical element 50 disposed in the lens 30, thereby providing a virtual image to the user.

In addition, at the same time, the real object image light output from a real object is transferred to the pupil of the eye of the user through the space between the lens 30 and the optical element 50, so that the virtual image and an image of the real object may be provided to the user at the same time.

Meanwhile, the optical module 100 may be an optical module for providing augmented reality or an optical module for providing virtual reality. When the optical module 100 is used for virtual reality, the lens 30 may be made of opaque glass or synthetic resin material.

Next, one embodiment of the lens holder 10 used in the optical module 100 described above will be described in more detail.

Figure 5:
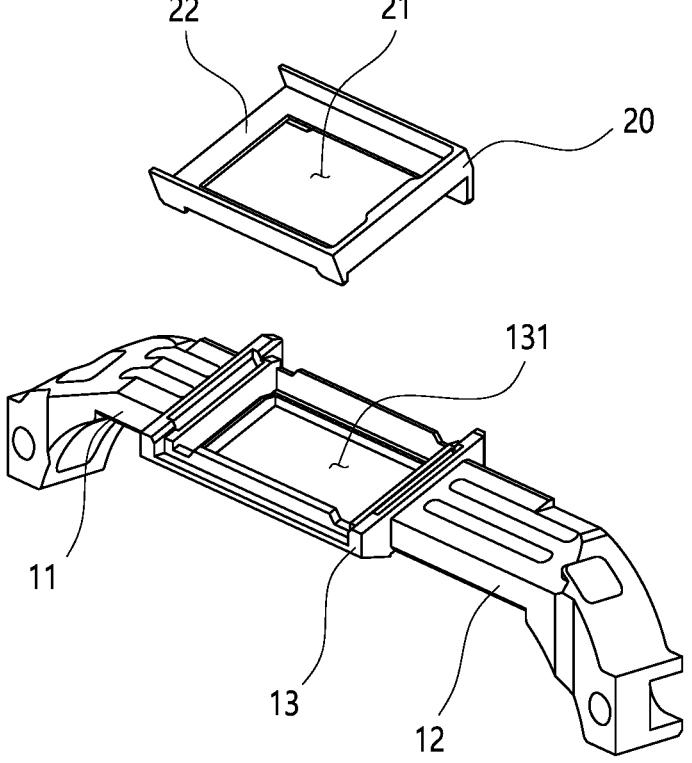
FIG. 5 is an exploded perspective view showing a lens holder and a display unit holder together.
Figure 6:
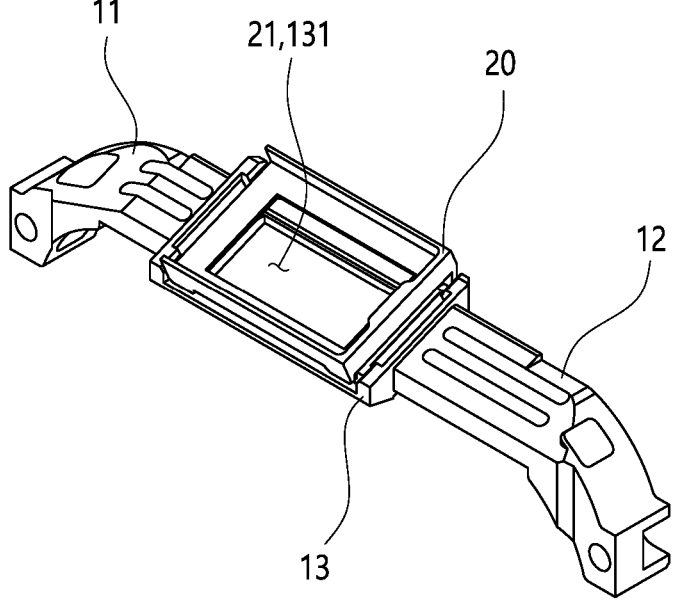
FIG. 6 is a perspective view of a state in which the display unit holder is disposed in the lens holder.

FIG. 5 is an exploded perspective view showing the lens holder 10 and the display unit holder 20 together, and FIG. 6 is a perspective view of a state in which the display unit holder 20 is disposed in the lens holder 10.

Referring to FIGS. 5 and 6 together with FIGS. 1 to 4, the lens holder 10 includes frames 11 and 12 and the display unit holder fixing part 13.

The frames 11 and 12 are means for being coupled to the lens 30 and fixing the lens 30.

The frames 11 and 12 may be coupled to at least a portion of the outer circumferential surface of the lens 30 and fix and support the lens 30.

As one embodiment, as shown in FIGS. 1 to 4, the frames 11 and 12 may be coupled to the upper portion of the outer circumferential surface of the lens 30. In this case, the frames 11 and 12 are formed to correspond to the shape of the outer circumferential surface of the upper portion of the lens 30.

However, this is an example, and the frames 11 and 12 may be coupled to at least a portion of the lower, left or right side of the outer circumferential surface of the lens 30 at a different position. In this case, the frames 11 and 12 have a shape corresponding to each coupling position.

Alternatively, the frames 11 and 12 may be coupled to the overall outer circumferential surface of the lens 30. In this case, the frames 11 and 12 may have a shape surrounding the overall outer circumferential surface of the lens 30.

As an embodiment, as shown in FIGS. 1 to 4, the frames 11 and 12 may include two frames extending to both sides with the display unit holder fixing part 13 as the center, i.e., the first and second frame 11 and 12.

In this case, the first and second frames 11 and 12 extend in opposite directions along the outer circumferential surface of the lens 30 with the display unit holder fixing part 13 as the center.

However, this is an example. For example, when the display unit holder fixing part 13 is formed at one end of one of the frames 11 and 12, only one frame may be used. In the following description, the first and second frames 11 and 12 will be collectively referred to as the frames 11 and 12 when there is no need to specifically distinguish them.

Meanwhile, recesses 14 and 15 (see FIG. 7) may be formed in the frames 11 and 12 to ensure secure coupling with the lens 30.

Figure 7:
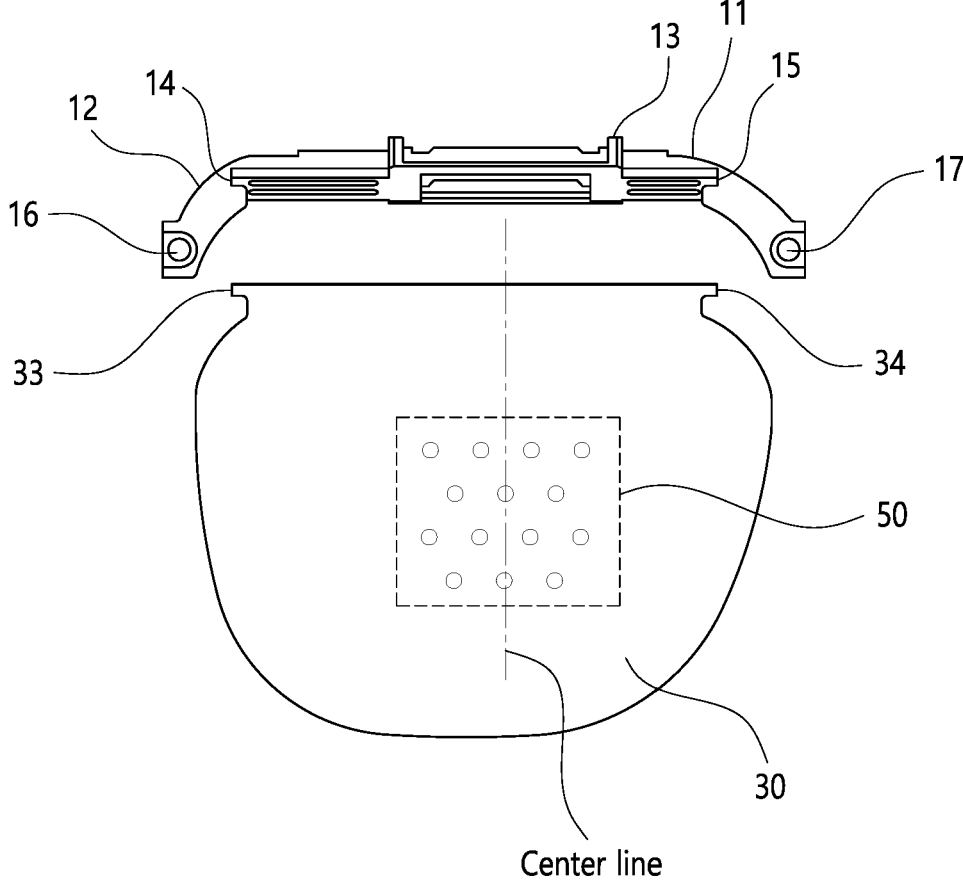
FIG. 7 is a rear view showing the lens holder and a lens together.

FIG. 7 is a rear view showing the lens holder 10 and the lens 30 together.

Referring to FIG. 7, the recesses 14 and 15 are formed in the inner surfaces of the frames 11 and 12 that are coupled to the outer circumferential surface of the lens 30. In addition, protrusions 33 and 34 having shapes that can be fitted into the shapes of the recesses 14 and 15 are formed at both ends of the outer circumferential surface of the lens 30 that are coupled to the frames 11 and 12 of the lens holder 10.

When the lens holder 10 is coupled to the lens 30, the recesses 14 and 15 are fitted over the protrusions 33 and 34 to securely fix the lens 30 and the lens holder 20 in close contact with each other.

In addition, an adhesive may be applied or an adhesive member may be attached to contact portions between the frames 11 and 12 and the lens 30 to more securely couple the frames 11 and 12 and the lens 30 together.

Meanwhile, screw fastening holes 16 and 17 configured to fasten screws therein may be formed in the frames 11 and 12. The screw fastening holes 16 and 17 may be used to combine the optical module 100 with other components in order to fabricate the binocular optical module 300 (see FIG. 15) or a glasses-type augmented reality provision device 400 (see FIGS. 16 and 17).

The display unit holder fixing part 13 is formed to be connected to the frames 11 and 12, and accommodates the display unit holder 20.

The display unit 40 is disposed in the display unit holder 20, and the display unit holder 20 is accommodated and fixed in the display unit holder fixing part 13 in a state in which the display unit 40 is disposed therein.

As described above, the lens holder 10 may be formed in such a manner that the first and second frames 11 and 12 extend to both sides with the display unit holder fixing part 13 as the center.

In this case, the display unit holder fixing part 13 is formed in the central portion of the lens holder 10. However, this is an example, and it is obvious that the display unit holder fixing part 13 may be disposed at a different position of the lens holder 10.

Meanwhile, as described above, the optical element 50 configured to transfer the virtual image light, output from the display unit 40, to the eye of the user is disposed in the lens 30. The display unit holder fixing part 13 is formed at an appropriate position of the lens holder 10 by taking into consideration the position where the optical element 50 is disposed in the lens 30.

For example, the display unit holder fixing part 13 may be formed in the lens holder 10 so that, in a state where the lens holder 10 is coupled and fixed to the lens 30, when the lens 30 is viewed such that the center of the region where the optical element 50 is disposed is located in front of the pupil, the width of the display unit 40 in the left-right direction at least partially overlaps the width of the region, where the optical element 50 is disposed, in the left-right direction.

Preferably, as shown in FIG. 7, in a state in which the lens holder 10 is coupled and fixed to the lens 30, when the lens 30 is viewed such that the center of the region where the optical element 50 is disposed is located in front of the pupil, the display unit holder fixing part 13 is formed in the lens holder 10 so that a vertical line passing through the center of the region where the optical element 50 is disposed coincides with a vertical line passing through the center of the display unit holder fixing part 13.

Meanwhile, the display unit holder 20 is accommodated and fixed in the display unit holder fixing unit 13 in a state in which the display unit 40 is disposed in the display unit holder 20. Accordingly, the display unit holder 20 serves to support the display unit 40.

As shown in FIGS. 5 and 6, the holder opening 21 configured such that the virtual image light output from the display unit 40 passes therethrough is formed in the display unit holder 20.

The virtual image light output from the display 42 of the display unit 40 is transferred to the lens 30 through the holder opening 21 and the opening 131 of the lens holder 10 to be described later. Accordingly, the holder opening 21 is formed to correspond to the shapes and sizes of the display 42 and the opening 131.

In general, the display 42 is formed in a rectangular shape, and thus the holder opening 21 is formed in a rectangular shape. However, the display 42 may have other shapes, in which case the holder opening 21 has corresponding shapes.

A display support part 22 is formed along the outer edges of the holder opening 21 to support the display unit 40 in contact with the outer surfaces of the display part 40. The display unit 40 may be supported in such a manner that the edges of the bottom surface of the display unit 40 come into contact with and are disposed on the display support part 22.

The opening 131 configured such that the virtual image light output from the display unit 40 and having passed through the holder opening 21 of the display unit holder 20 passes therethrough is formed in the display unit holder fixing part 13.

As shown in the drawing, the opening 131 may be formed in the bottom surface of the inside of the display unit holder fixing part 13.

As described above, the virtual image light output from the display 42 of the display unit 40 is transferred to the lens 30 through the holder opening 21 of the display unit holder 20 and the opening 131. Accordingly, the opening 131 is formed to have a shape and size corresponding to the shape and size of the display 42 and the holder opening 21.

Although the opening 131 is preferably formed in a rectangular shape as described above, it is obvious that the opening 131 may have other shapes.

Meanwhile, the display unit holder 20 is accommodated and fixed in the display unit holder fixing part 13 in a state in which the display 40 is disposed in the display unit holder 20. In this case, the position of the display unit holder 20 is adjusted while being finely moved or rotated within the display unit holder fixing part 13, and then the display unit holder 20 is fixed to the display unit holder fixing part 13.

The reason for this is to align the display unit 40 so that the virtual image light output from the display unit 40 can be accurately transferred to the optical element 50 according to design requirements.

Accordingly, it is preferable that the size of the display unit holder fixing part 13 be slightly larger than the size of the display unit holder 20 so that the display unit holder 20 can move finely within the display unit holder fixing part 13.

For example, it is desirable that the length of the display unit holder fixing part 13 in the left-right direction be made longer than the length of the display unit holder 20 in the left-right direction by about 0.1 to 0.5 mm, so that gaps are formed between the left and right ends of the display unit holder fixing part 13 and the left and right ends of the display unit holder 20.

The reason for this is that the cumulative tolerances generated during the processing of the lens 30 and the assembly of the display unit holder 20 and the lens holder 10 are taken into consideration. When the cumulative tolerance and the positional tolerance of the active area of the display unit 40 are considered, a gap of about 0.3 mm is required. When a gap of about 0.2 mm is added to the above gap to improve workability and yield, it is preferable to form a maximum gap of about 0.5 mm.

A fine adjustment operation such as the operation of moving the position of the display unit holder 20 within the display unit holder fixing part 13, the operation of rotating the display unit holder 20 around an axis parallel to the outer circumferential surface of the lens 30, or the operation of moving the display unit holder 20 vertically is performed. Thereafter, the display unit holder 20 is tightly fixed to the display unit holder fixing part 13 by applying an adhesive between the display unit holder 20 and the display unit holder fixing part 13.

According to the lens holder 10 described above, when the display unit holder 20 and the display unit 40 are assembled together with the lens holder 10, processing may be performed on a per-module basis. Accordingly, basic alignment may be achieved simply by disposing the display unit holder 20 on the lens holder 10. Further, as described above, there is an advantage in that more accurate positioning can be easily performed while moving the display unit holder 20.

In particular, the display unit 40 may be easily arranged by setting the position of the display unit holder fixing unit 13 in advance in accordance with the arrangement of the optical element 50, so that the virtual image light from the display unit 40 can be output to the optical element 50 more accurately.

Meanwhile, the display unit holder fixing part 13 of the lens holder 10 may include foreign material accommodating portions 135 and 136 (see FIGS. 8 to 10) configured to block the inflow of a foreign material from the outside by accommodating the foreign material.

Figure 8:
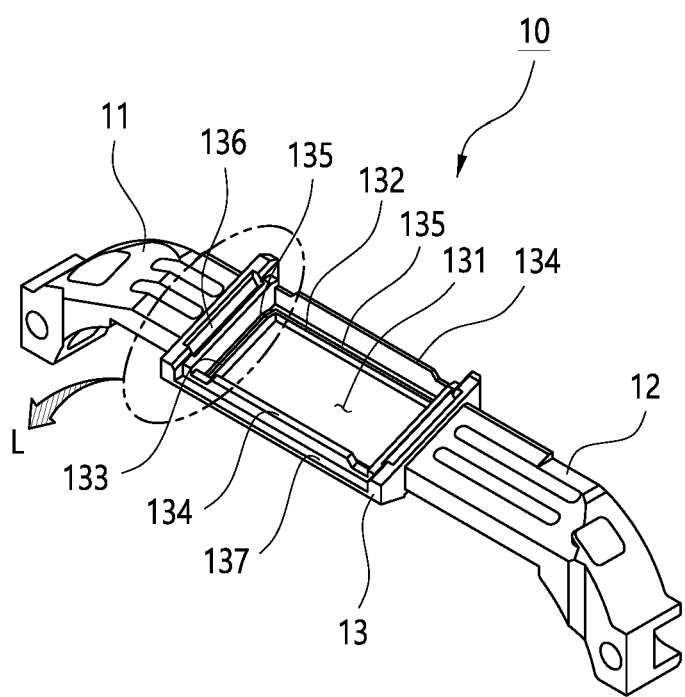
FIGS. 8 and 9 are perspective and plan views of a lens holder according to an embodiment of the present invention, respectively.
Figure 9:
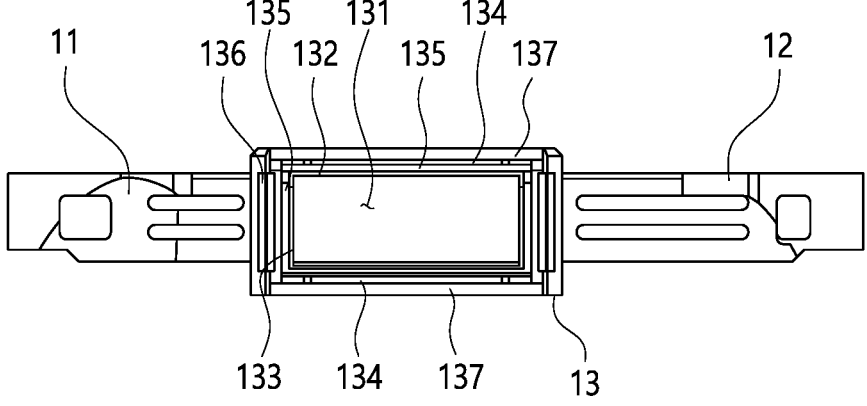
Figure 10:
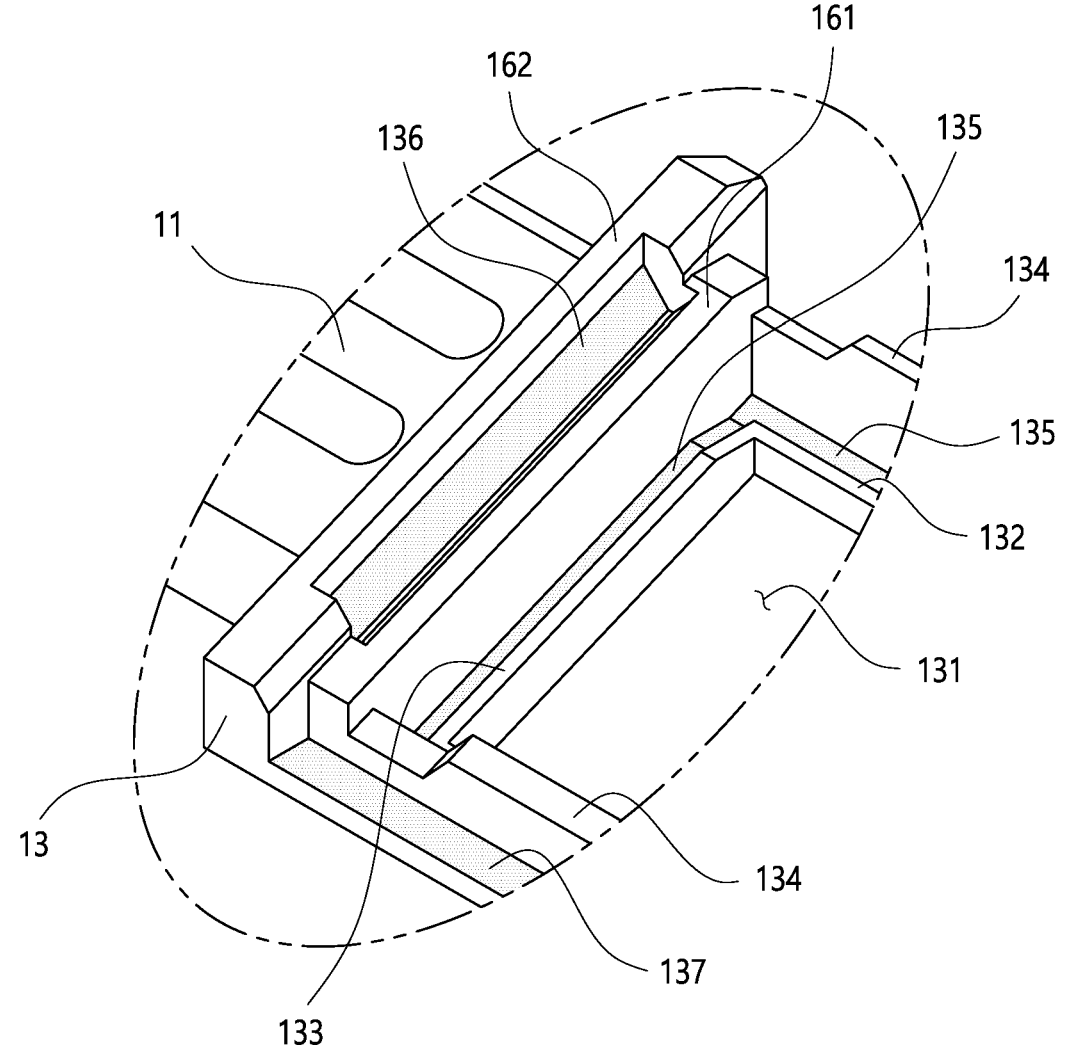
FIG. 10 is a partially enlarged perspective view of portion L of FIG. 8.

FIGS. 8 and 9 are perspective and plan views of the lens holder 10 according to an embodiment of the present invention, respectively, and FIG. 10 is a partially enlarged perspective view of portion L of FIG. 8.

Referring to FIGS. 8 to 10, the foreign material accommodating portions 135 and 136 may include an inner groove 135 formed in the bottom surface of the display unit holder fixing part 13 and/or outer grooves 136 formed in the lateral sides of the display unit holder fixing part 13.

The inner groove 135 and the outer grooves 136 will be described in more detail below.

First, the inner groove 135 will be described.

As described above, the opening 131 is formed in the bottom surface of the display unit holder fixing part 13. The inner groove 135 may be formed in the bottom surface of the display unit holder fixing part 13 at the outer edges of the opening 131.

As one embodiment, front and rear edge portions 132 and side edge portions 133 may be formed at the outer edges of the opening 131, and the inner groove 135 may be formed by the front and rear edge portions 132 and the side edge portions 133.

The front and rear edge portions 132 are formed on the front and rear sides of the opening 131, and the side edge portions 133 are formed on the lateral sides of the opening 131.

In this case, the front and rear sides are defined as both directions perpendicular to the directions in which the frames 11 and 12 extend with the opening 131 as the center on the drawing, and the lateral sides are defined as both directions in which the frames 11 and 12 extend with the opening 131 as the center on the drawing.

However, it should be noted that these are relative positions and not absolute positions. These will be the same below.

Based on the state in which a user wears the optical module 100, when it is assumed that the center of the region where the optical element 50 is disposed is disposed in front of the pupil, the forward and rearward directions from the pupil may be viewed the front and rear sides, and the left and right directions perpendicular to the forward and rearward directions from the pupil may be viewed as the lateral sides.

The front and rear edge portions 132 and the side edge portions 133 are formed higher than the opening 131. The heights of the front and rear edge portions 132 and the heights of the side edge portions 133 do not have to be the same. The side edge portions 133 may be formed higher than the front and rear edge portions 132, as shown in the drawing.

Although the front and rear edge portions 132 and the side edge portions 133 preferably extend along the overall area of the edges of the opening 131, they may be formed in part along the edges.

Support plates 134 are formed spaced apart from the front and rear edge portions 132 outside the front and rear edge portions 132 from the opening 131.

The support plates 134 are formed to protrude upward from the bottom surface of the display unit holder fixing part 13, preferably vertically. Furthermore, the support plates 134 are preferably formed parallel to the direction in which the front and rear edge portions 132 extend.

The height of the support plates 134 is preferably formed higher than the height of the front and rear edge portions 132. As will be described later, the support plates 134 are preferably as high as possible because they serve to block the inflow of a foreign material from the outside into the lens holder 10.

Furthermore, first side walls 161 are formed spaced apart from the side edge portions 133 outside the side edge portions 133 from the opening 131.

The first sidewalls 161 are also formed to protrude upward from the bottom surface of the display unit holder fixing part 13, preferably vertically. Furthermore, the first side walls 161 are preferably formed parallel to the direction in which the side edge portions 133 extend.

The heights of the first side walls 161 are preferably formed higher than the height of the side edge portions 133. Since the first sidewalls 161 also serve to block a foreign material from entering the lens holder 10, it is desirable to make the first side walls 161 as high as possible.

Since the support plates 134 and the front and rear edge portions 132 are spaced apart from each other and protrude upward from the display unit holder fixing part 13, the internal grooves 135 are formed along the edges of the front and rear sides of the opening 131 by these and the bottom surface of the display unit holder fixing part 13.

In addition, since the first side walls 161 and the side edge portions 133 are also spaced apart from each other and protrude upward from the display unit holder fixing part 13, the inner grooves 135 are formed along the edges of the sides of the opening 131 by these and the bottom surface of the display unit holder fixing part 13.

The inner grooves 135 formed by the support plates 134 and the front and rear edge portions 132 and the inner grooves 135 formed by the first side walls 161 and the side edge portions 133 perform the same function except that they are formed on the front and rear sides or the lateral sides. Although all of them may be used as the inner grooves 135, it is obvious that it may be possible to use only one of them.

Meanwhile, accommodation plates 137 may be formed outside the support plates 134 of the display unit holder fixing part 13.

Figure 13:
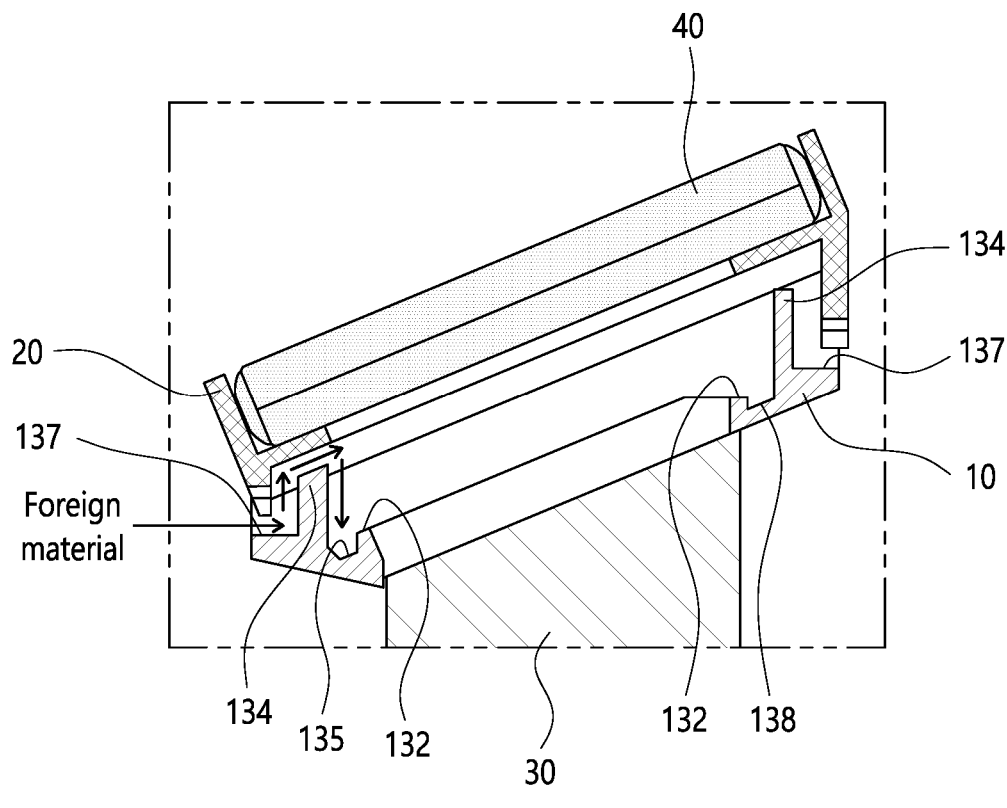
FIG. 13 is a partial sectional view taken along line A-A' of FIG. 3 in a state in which the lens and the display unit holder are coupled to the lens holder.

The accommodation plates 137 extend to have an inclination angle with respect to the direction in which the supporting plates 134 protrude (see FIG. 13).

Accordingly, due to the inclination angle between the accommodation plates 137 and the support plates 134, the spaces between them act as grooves. Therefore, since a foreign material from the front and rear surfaces of the lens holder 10 may be primarily blocked at the front ends of the inner grooves 135, the foreign material from the front and rear surfaces may be blocked more reliably.

A foreign material from the outside may be accommodated by the inner grooves 135, and thus the foreign material may be prevented from flowing into the opening 131.

Next, the outer grooves 136 will be described.

The outer grooves 136 may be formed on the lateral sides of the display unit holder fixing part 13.

The outer grooves 136 may be formed in the portions of the display unit holder fixing part 13 present outside the side edge portions 133 and adjacent to the frames 11 and 12. For example, as shown in FIG. 10, the outer grooves 136 may be formed outside the inner groove 135.

As one embodiment, as shown in the drawings, the outer grooves 136 are formed to extend along the sides of the display unit holder fixing part 13. As described above, the side edge portions 133 are formed on the lateral sides of the opening 131, and thus the outer grooves 136 may extend parallel to the side edge portions 133.

The outer grooves 136 extend along the lateral sides of the display unit holder fixing part 13, and may each be formed by two side walls 161 and 162 spaced apart from each other. One of the two side walls is the first side wall 161 used to form the inner groove 135, and the outer groove 136 may be formed by the second side wall 162 formed spaced apart from the first side wall 161 and the first side wall 161.

However, this is an example. It is obvious that a side wall separate from the first side wall 161 forming the inner groove 135 may be used.

The second side walls 162 are also formed to protrude upward from the bottom surface of the display unit holder fixing part 13, preferably vertically.

Like the first side walls 161, the second side walls 162 are also preferably formed parallel to the directions in which the side edge portions 133 extend. In this case, the first sidewalls 161 and the second sidewalls 162 extend parallel to each other.

Although the second sidewalls 162 are preferably formed higher than the first sidewalls 161 as shown in the drawing, the height of the first sidewalls 161 and the height of the second sidewalls 162 may be the same, or the height of the first sidewalls 161 may be higher than that of the second sidewalls 162.

The bottom surfaces between the first side walls 161 and the second side walls 162 are formed lower than the first side walls 161 and the second side walls 162. The outer grooves 136 are formed by the bottom surfaces and the first side walls 161 and the second side walls 162. A foreign material from the outside may be accommodated in the outer grooves 136.

Meanwhile, the inner surfaces of the first and second sidewalls 161 and 162 beside the outer grooves 136 may be formed not to be parallel to the directions in which the first and second sidewalls 161 and 162 protrude. In this case, the cross sections of the inner surfaces may be inclined toward the inside of the outer groove 136 to appear like a "V" shape.

Figure 12:
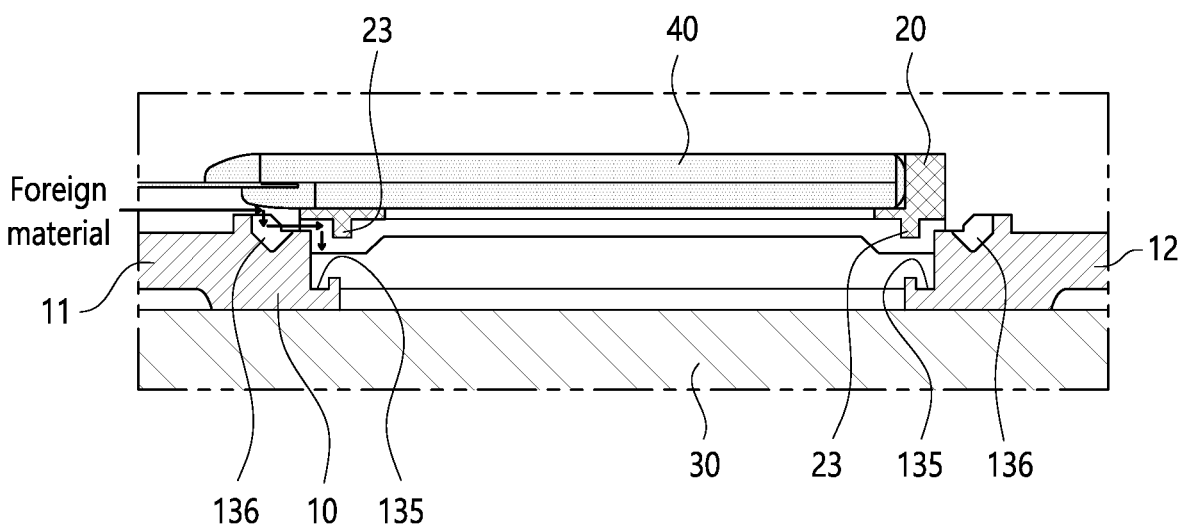
FIG. 12 is a partial sectional view taken along line B-B' of FIG. 4 in a state in which the lens and the display unit holder are coupled to the lens holder.

The outer grooves 136 serve as spaces for accommodating a foreign material, such as dust, introduced through the gaps on the sides between the display unit holder 20 and the display unit holder fixing part 13 when the display unit holder 20 is disposed on the display unit holder fixing part 13 (see FIG. 12).

Meanwhile, in order to assist the function of the inner groove 135, blocking plates 23 configured to change the direction in which a foreign material incoming from the outside moves and guide it to the inner groove 135 may be formed on the bottom surface of the display unit holder 20.

Figure 11:
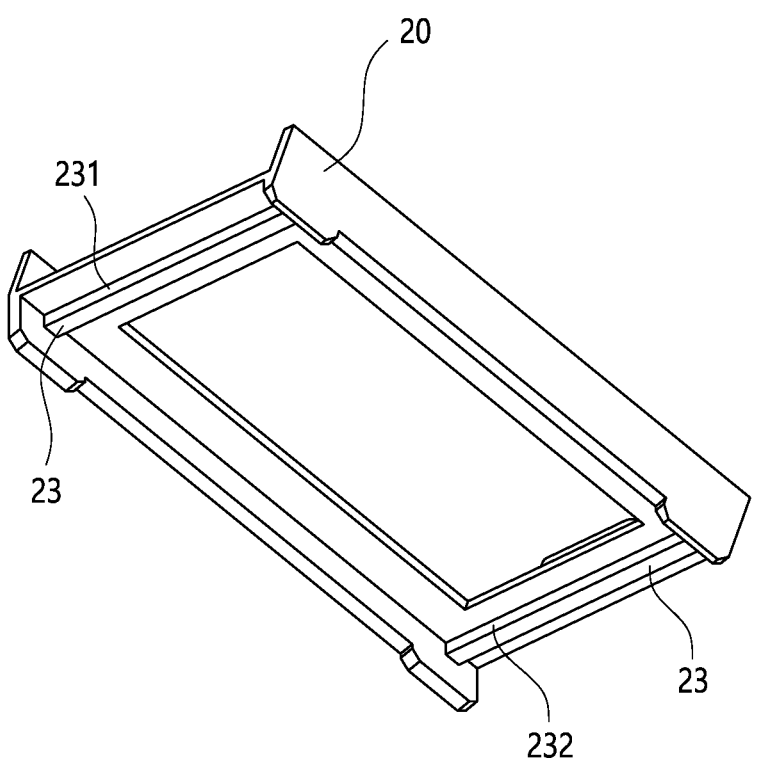
FIG. 11 is a perspective view of the display unit holder viewed from the bottom side thereof.

FIG. 11 is a perspective view of the display unit holder 20 viewed from the bottom side thereof.

Referring to FIG. 11, the blocking plates 23 are formed to protrude downward from the bottom surface of the display unit holder 20, preferably vertically. Furthermore, the blocking plates 23 extend parallel to the directions in which the outer grooves 136 extend.

The blocking plates 23 are preferably formed on the bottom surface of the display unit holder 20 so that, when the display unit holder 20 is disposed in the display unit holder fixing part 13, the outer surfaces 231 of the blocking plates 23 are placed aligned with the outer surfaces of the side edge portions 133 forming the inner groove 135 or are located slightly closer to the opening 131 than the outer surfaces of the side edge portions 133.

Figure 4:
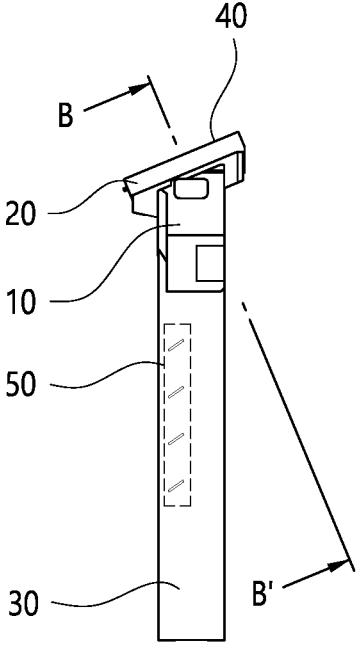

FIG. 12 is a view illustrating the effect of blocking a foreign material incoming from the sides of the lens holder 10, which is a partially sectional view taken along line B-B' of FIG. 4 in a state in which the lens 30 and the display unit holder 20 are coupled to the lens holder 10.

Referring to FIG. 12, in a state where the display unit holder 20 is disposed in the display unit holder fixing unit 13 and the lens holder 10 is coupled to the lens 30, a foreign material may be introduced from the outside through one of the side gaps between the display unit holder fixing part 13 and the display unit holder 20, as indicated by arrows. In this case, the foreign material may be primarily accommodated and blocked by the outer grooves 136 as described above.

Furthermore, a foreign material not accommodated in the outer grooves 136 may be secondarily received by the inner groove 135. In this case, as described above, a foreign material may be guided to the inner groove 135 by the blocking plates 23 formed on the bottom surface of the display unit holder 20, and thus a foreign material blocking efficiency may be increased.

By this configuration, a foreign material from the outside may be effectively blocked from entering the space on the optical path of the virtual image light, output from the display 42, from the lateral sides of the lens holder 20.

Figure 3:
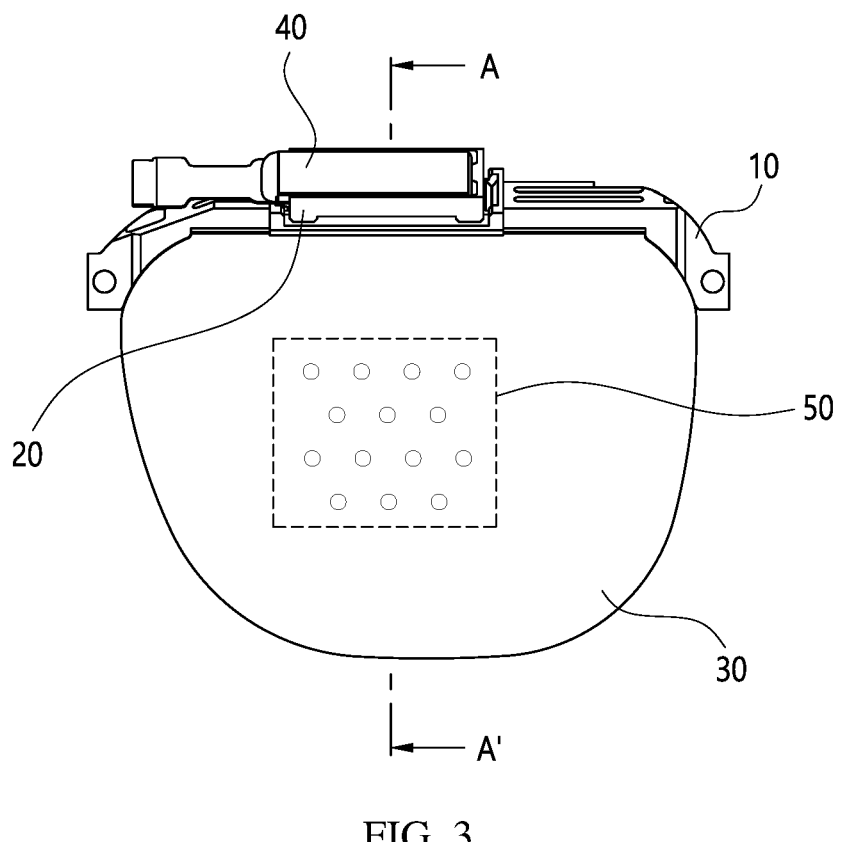

FIG. 13 is a view illustrating the effect of blocking a foreign material incoming from the front and rear sides of the lens holder 10, which is a partial sectional view taken along line A-A' of FIG. 3 in a state in which the lens 30 and the display unit holder 20 are coupled to the lens holder 10.

Referring to FIG. 13, in a state where the display unit holder 20 is disposed in the display unit holder fixing part 13 and the lens holder 10 is coupled to the lens 30, a foreign material may be introduced from the outside through one of the front and rear gaps between the display unit holder fixing part 13 and the display unit holder 20, as indicated by the arrows. In this case, a foreign material may be primarily accommodated by the spaces between the accommodation plates 137 and the support plates 134, as described above.

Furthermore, a foreign material not accommodated in the spaces may be secondarily accommodated by the inner groove 135.

By this configuration, a foreign material incoming from the outside may be effectively blocked from entering the space on the optical path of the virtual image light, output from the display 42, from the front and rear sides of the lens holder 20.

Meanwhile, in the above embodiments, a sticking member for sticking to a foreign material may be applied to at least one of the bottom surfaces of the inner groove 135, the outer grooves 136, and the accommodation plates 137.

Furthermore, it may also be possible to employ only one of the inner groove 135 and the outer grooves 136 or to employ both the inner groove 135 and the outer grooves 136, as needed. In the case where the inner groove 135 is employed, the blocking plates 23 may be omitted if necessary.

Figure 14:
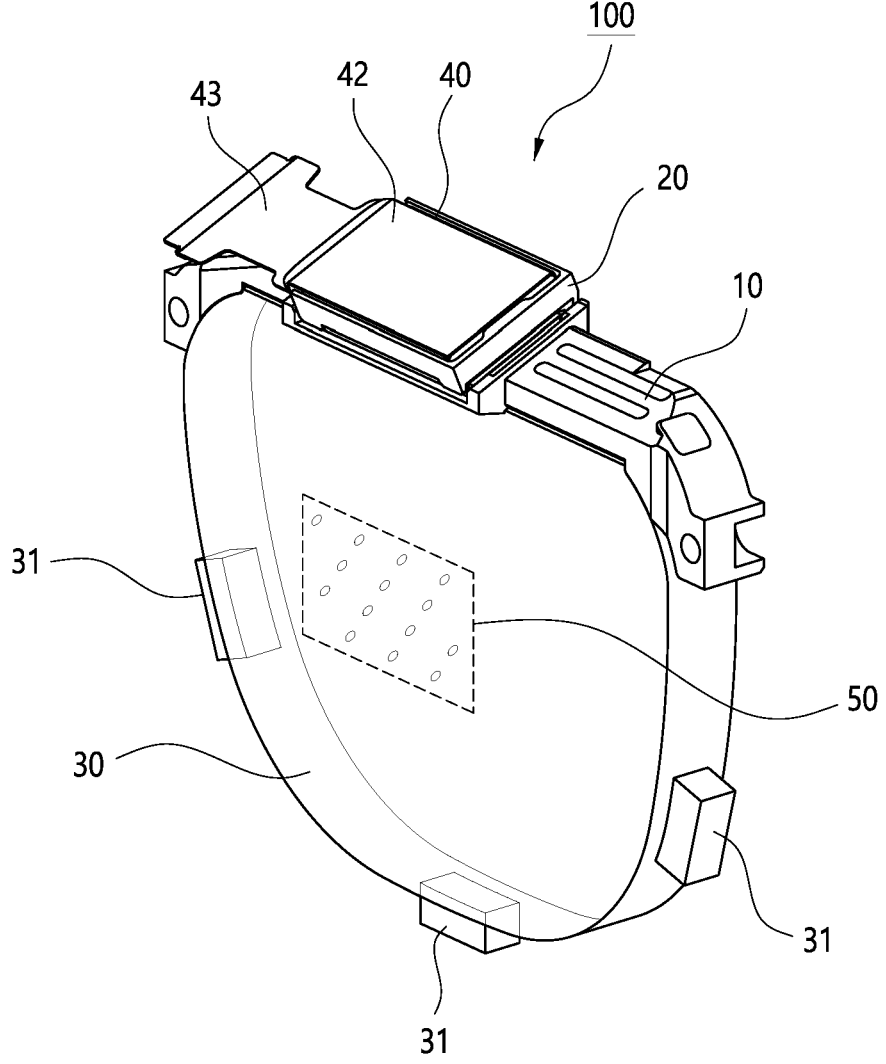
FIG. 14 is a perspective view of an optical module including a lens holder according to another embodiment of the present invention.

FIG. 14 is a perspective view of an optical module 100 including a lens holder 10 according to another embodiment of the present invention.

The embodiment of FIG. 14 is the same as the optical module 100 of the above-described embodiment, except that the embodiment of FIG. 14 further includes one or more protrusions 31 protruding from at least portions of the outer circumferential surface of the lens 30.

As shown in the drawing, the protrusions 31 may be formed to protrude from portions of the outer circumferential surface of the lens 30 other than the portion of the outer circumferential surface of the lens 30 coupled to the frames 11 and 12 of the lens holder 10.

For example, when the frames 11 and 12 of the lens holder 10 are coupled to the upper portion of the outer circumferential surface of the lens 30 as described above, the protrusions 31 may be formed on the lower portion of the outer circumferential surface of the lens 30 and both side surfaces of the outer circumferential surface of the lens 30.

The protrusions 31 serve as guides for minimizing the tolerances that may occur when the optical module 100 together with other parts is assembled into the binocular module 300 (see FIG. 15) or the glasses-type augmented reality provision device 400 (see FIGS. 16 and 17)

For example, recesses (not shown) configured such that the protrusions 31 can be fitted thereinto are formed inside each rim of the glasses-type augmented reality provision device 400 (see FIGS. 16 and 17), and the protrusions 31 are fitted and coupled into the grooves. Accordingly, assembly is facilitated, and tolerances that may occur during assembly may be minimized.

Figure 15:
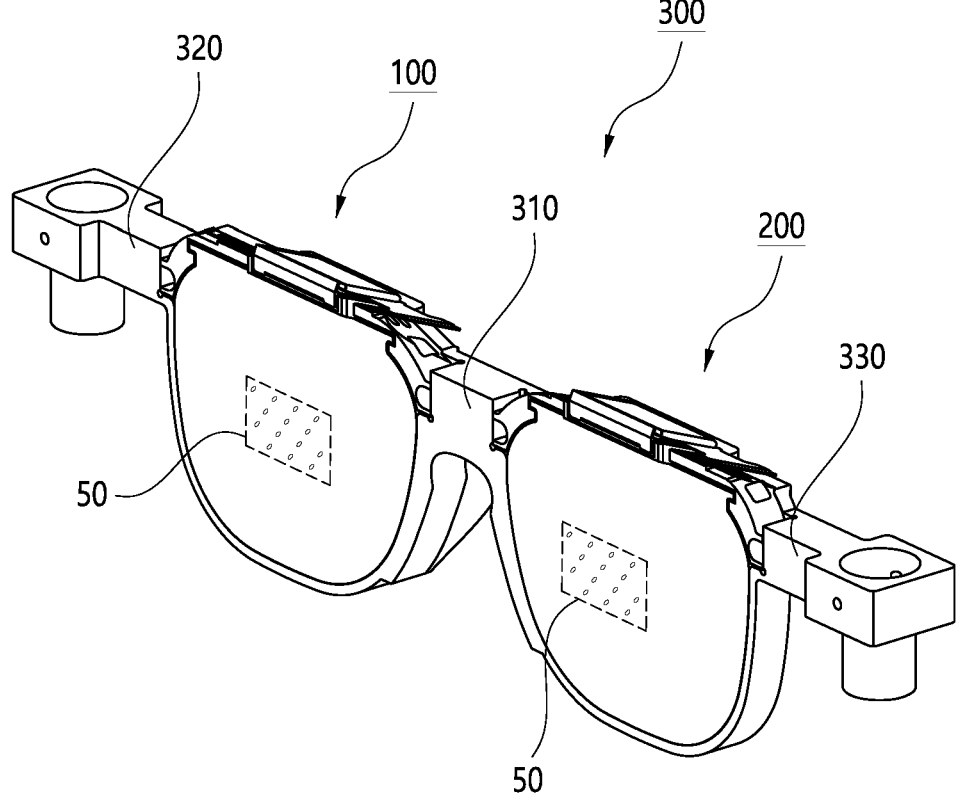
FIG. 15 is a perspective view of a binocular optical module.

The protrusions 31 are particularly useful in the case of the binocular optical module 300 (see FIG. 15).

In the case of the binocular optical module 300, the cumulative tolerance of the left and right lenses 30 may occur, which may cause dipvergence and convergence problems. Such dipvergence and convergence problems make assembly Such difficult and become a factor that lowers manufacturing efficiency.

The protrusions 31 serve as guides for preventing dipvergence and convergence problems attributable to tolerances during assembly in the binocular optical module 300.

Meanwhile, as another embodiment, it may also be possible to form concave portions (not shown) instead of the protrusions 31. In other words, one or more recess-shaped concave portions (not shown) may be formed in at least portions of the outer circumferential surface of the lens 30.

For example, one or more concave portions may be formed in the form of recesses at the positions where the protrusions 31 are formed, and protrusions (not shown) may be formed inside each rim of the glasses-type augmented reality provision device 400. Accordingly, the protrusions are fitted into the concave portions during assembly. These concave portions may provide the same function as the protrusions 31 described with reference to FIG. 14.

FIG. 15 is a perspective view of the binocular optical module 300.

Referring to FIG. 15, the binocular optical module 300 includes an optical module 100 for the left eye, an optical module 200 for the right eye, and a glasses frame-shaped edge part 310 configured to fix the optical modules 100 and 200.

The optical module 100 for the left eye and the optical module 200 for the right eye are each composed of the optical module 100 described above.

The edge part 310 is formed in the shape of a glasses frame, and fixes the optical module 100 for the left eye and the optical module 200 for the right eye.

Although the edge part 310 is shown in a form surrounding the overall outer circumferential surface of each lens 30 including the lateral and lower side of the lens 30 in FIG. 15, this is an example. For example, the edge part 310 may be formed to be coupled to a portion of the outer circumferential surface of the lens 30 (see FIGS. 16 and 17).

Connection portions 320 and 330 for connection with other parts of the augmented reality provision device may be formed at both ends of the outer sides of the edge part 310.

Meanwhile, recesses (not shown) configured such that the protrusions 31 of the lenses 30 described above are fitted thereinto are formed in the inner surface of the edge part 310.

As described above, when the optical module 100 for the left eye and the optical module 200 for the right eye are coupled to the edge part 310, the protrusions 31 are fitted into the recesses, thereby minimizing the tolerance according to design requirements. Therefore, as described above, the dipvergence and convergence problems occurring in the binocular optical module 300 may be prevented, so that manufacturing convenience can be improved and yield can be increased, thereby reducing manufacturing cost.

Meanwhile, in the case of the binocular optical module 300, the display unit holder fixing part 13 is preferably disposed on the lens holder 10 so that, when viewed forward from the pupil, a vertical line passing through the center of the display unit holder fixing part 13 is located, e.g., about 0.5 mm inward from a vertical line passing through the center of the region where the optical element 50 is disposed.

In other words, the display unit holder fixing parts 13 of the binocular optical module 300 are preferably located slightly inward, i.e., toward the edge part 310 between the optical module 100 for the left eye and the optical module 200 for the right eye, compared to the monocular optical module 100 described above.

The reason for this is that the binocular convergence angle generated in the binocular optical module 300 is taken into consideration.

In order to satisfy the binocular convergence angle, PPD (Pixel per Degree=the resolution/horizontal FOV of the display 42) is determined and then a pixel value satisfying the binocular convergence angle is calculated (the binocular convergence angle*PPD). When this pixel value is calculated, a necessary value for the movement of the display 42 is generally calculated as a value less than about 0.5 mm (the number of pixels*the pixel size).

Accordingly, it is preferable to dispose the display unit holder fixing part 13 slightly inward compared to that of the above-described optical module 100 so that the display 42 can be moved and disposed by taking into consideration the above value.

Furthermore, in the binocular optical module 300, it is desirable to set the above-described position of the display unit holder fixing part 13 by taking into consideration a preset IPD range, an image convergence, and a wrap angle. When these requirements are taken into consideration in an integrated manner, the display unit holder fixing part 13 may be disposed slightly outward compared to that of the above-described optical module 100.

Meanwhile, the glasses-type augmented reality provision device 400 (see FIGS. 16 and 17) may be fabricated in the form of a finished product by embedding the lens holders 10 of the binocular optical module 300 of FIG. 15 in the upper part of a glasses frame.

The optical module 100 and binocular optical module 300 described above may be fabricated in various forms as needed. For example, the monocular optical module 100 or 200 described with reference to FIGS. 1 to 14, i.e., the optical module 100 or 200 for the left eye or the right eye, may be fabricated and provided, and the binocular optical module 300 described with reference to FIG. 15 may be fabricated and provided.

Furthermore, the optical modules 100 or 200 may be separately fabricated for the left eye and the right eye, respectively, and may be provided together with a glasses frame capable of fastening them. In this case, the glasses frame preferably has a structures described in FIG. 15.

Alternatively, it is obvious that a device-type augmented reality provision device may also be implemented by combining the edge part of FIG. 15 with one of the monocular optical modules 100 or 200.

FIGS. 16 and 17 are perspective and front views of the glasses-type augmented reality provision device 400 implemented in the form of smart glasses according to an embodiment of the present invention, respectively.

Referring to FIGS. 16 and 17, the glasses-type augmented reality provision device 400 is formed in the shape of glasses as a whole, and includes the above-described binocular optical module 300, a frame part 410, and fixation parts 420.

The lens holders 10 of the binocular optical module 300 are embedded and disposed inside the frame part 410.

Although the frame part 410 is formed only on the upper portions of the lenses 30 in FIG. 16, it may be formed to surround the overall outer circumferential surfaces of the lenses 30 (see FIG. 15).

The fixation parts 420 are coupled to the frame part 410, and are means for fixing the glasses-type augmented reality provision device 400 to be worn on the face of a user. As shown in the drawing, it may be formed in the shape of glasses temples that can be worn over the ears of the user.

Although not shown, a connection port (not shown) configured to enable connection to a smartphone or computer is formed at the end of one of the fixation parts 420, and the connection port and a data cable connected to the cables 43 of the displays 42 may be disposed inside the fixation part 420 and the frame part 410.

With this configuration, it is possible to receive still image or moving image data from the smartphone or computer, transfer the received data to the display 42 so that it is displayed on the display 42, and allow virtual image light to be output therefrom.

According to the augmented reality provision device 400, there may be provided so-called "smart glasses" that are more comfortable to wear and minimize a sense of difference compared to the prior art like conventional glasses.

Meanwhile, although the augmented reality provision device 400 including the binocular optical module 300 has been described with reference to FIGS. 16 and 17, it is obvious that this description is applicable to the monocular optical module 100 without essential change.

Furthermore, a separate circuit board (not shown) may be embedded in each of the above-described monocular optical module 100 and binocular optical module 300. The circuit board may be embedded in the frame, or may be freely embedded in a region other than the optical path of the virtual image light output from the display 42. The circuit board may serve to improve the performance of the monocular optical module 100 or the binocular optical module 300 when a separate power supply is supplied.

For example, the circuit board may be embedded in the monocular optical module 100 and transfer signals for the correction of color coordinates of the monocular optical module 100 to the display 42.

Alternatively, the circuit board is embedded in the monocular optical module 100. When such monocular optical modules 100 are paired and used in a glasses-type device or the like, the binocular parallax of the glasses-type device or the like may be corrected by moving the position of the image using the margin areas of displays 42. This may be applied to the binocular optical module 300 in the same manner.

Furthermore, the circuit board may mitigate a problem (e.g., the occurrence of defective pixels attributable to deterioration, or the like) by transferring a signal to shift an image to the margin region of the display 42 or to compensate for the shape of an image when the problem occurs in the display 42.

The circuit board may change the shapes of images output from the display 42 according to the preference of the user of the monocular optical module 100 or binocular optical module 300. For example, the circuit board may transfer signals to the display 42 so that images in a polygonal shape such as a square or images having a curvature such as that of a circle are displayed according to the preference of the user.

Alternatively, the circuit board may transfer signals to adjust the sizes of images output from the monocular optical module 100 or the binocular optical module 300.

Furthermore, the circuit board may be electrically connected to the display 42 and exchange signals checking whether the display 42 has been set to preset conditions.

According to the present invention, there may be provided the lens holder capable of increasing the manufacturing convenience of an optical module used in augmented reality or virtual reality and minimizing tolerance during assembly, and the optical module including the lens holder.

In particular, the present invention may provide the lens holder capable of efficiently preventing dipvergence and convergence problems that may occur in a binocular optical module, and the optical module including the lens holder.

Furthermore, according to the present invention, there may be provided the lens holder having a foreign material blocking function capable of effectively blocking the inflow of a foreign material such as dust, and the optical module including the lens holder.

Moreover, according to the present invention, there may be provided the glasses-type augmented reality provision device including such an optical module.

Although the present invention has been described above with reference to the embodiments of the present invention, this is an example. A person having ordinary skill in the art to which the present invention pertains may make other various modifications and alterations within the scope of the present invention determined by the attached claims and the accompanying drawings. It should be noted that these modifications and alterations are all included in the scope of equivalent rights of the present invention.

What is claimed is:

1. A lens holder comprising:
   frames configured to be coupled to a lens and fix the lens; and
   a display unit holder fixing part configured to be connected to the frames and accommodate a display unit holder;
   wherein the display unit holder fixing part has a foreign material accommodation portion configured to accommodate a foreign material incoming from an outside; and
   wherein the foreign material accommodation portion includes at least one of an inner groove formed in a bottom surface of the display unit holder fixing part and outer grooves formed in lateral sides of the display unit holder fixing part.

2. The lens holder of claim 1, wherein the frames are coupled to at least a portion of an outer circumferential surface of the lens and fix the lens.

3. The lens holder of claim 1, wherein the frames include first and second frames extending in opposite directions along an outer circumferential surface of the lens with the display unit holder fixing part as a center thereof.

4. The lens holder of claim 1, wherein the frames are provided with at least one recess configured to be fitted over a protrusion formed on the lens.

5. The lens holder of claim 1, wherein the display unit holder is accommodated and fixed in the display unit holder fixing part in a state in which a display unit is disposed in the display unit holder.

6. The lens holder of claim 5, wherein a gap is formed between the display unit holder fixing part and the display unit holder so that the display unit holder can be moved or rotated within the display unit holder fixing part.

7. The lens holder of claim 1, wherein:
   a holder opening configured such that virtual image light output from the display unit passes therethrough is formed in the display unit holder;
   an opening configured such that virtual image light output from the display unit and having passed through the holder opening of the display unit holder passes therethrough is formed in the display unit holder fixing unit; and
   the inner groove is formed in outer edges of the opening.

8. The lens holder of claim 7, wherein:
   front and rear edge portions are formed along outer edges of front and rear sides of the opening of the display unit holder fixing part;
   support plates are formed spaced apart from the front and rear edge portions outside the front and rear edge portions; and
   the inner groove is defined by the support plates, the front and rear edge portions, and the bottom surface of the display unit holder fixing part.

9. The lens holder of claim 8, wherein accommodation plates extending to have an inclination angle with respect to a direction in which the support plates protrude are disposed outside the support plates.

10. The lens holder of claim 9, wherein sticking members configured to stick to a foreign material are applied to bottom surfaces of the accommodation plates.

11. The lens holder of claim 7, wherein:

side edge portions are formed at outer edges of lateral sides of the opening;

side walls are formed spaced apart from the side edge portions outside the side edge portions; and the inner groove is defined by the side walls, the side edge portions, and the bottom surface of the display unit holder fixing part.

12. The lens holder of claim 7, wherein blocking plates configured to protrude downward from a bottom surface of the display unit holder and to change a direction in which a foreign material incoming from an outside moves and guide it to the inner groove are formed on the bottom surface of the display unit holder.

13. The lens holder of claim 12, wherein side edge portions are formed at outer edges of lateral sides of the opening;

the blocking plates are formed such that, when the display unit holder is disposed in the display unit holder fixing part, outer surfaces of the blocking plates are located aligned with outer surfaces of the side edge portions or are located closer to the opening than the outer surfaces of the side edge portions.

14. The lens holder of claim 1, wherein the outer grooves extend along lateral sides of the display unit holder fixing part, and are each defined by two side walls spaced apart from each other.

15. The lens holder of claim 14, cross sections of inner surfaces of the two side walls beside the outer grooves are inclined toward an inside of the outer grooves to appear like a "V" shape.

16. The lens holder of claim 1, wherein a sticking member configured to stick to a foreign material is applied to at least one of a bottom surface of the inner groove and bottom surfaces of the outer grooves.

17. An optical module comprising:

the lens holder of claim 1;

a display unit holder configured to be accommodated and fixed in the lens holder and support a display unit;

the display unit configured to be disposed and supported in the display unit holder and output virtual image light; and a lens configured to transfer real object image light, output from a real object, to an eye of a user by transmitting the real object image light therethrough, and also configured such that an optical element for transferring virtual image light, output from the display unit, to the eye of the user is disposed therein.

18. The optical module of claim 17, wherein at least one protrusion is formed on at least a portion of an outer circumferential surface of the lens.

19. The optical module of claim 17, wherein at least one concave portion in a form of a recess is formed in at least a portion of an outer circumferential surface of the lens.

20. The optical module of claim 17, wherein the display unit holder fixing part is formed in the lens holder so that a width of the display unit in a left-right direction at least partially overlaps a width of an area, where the optical element is disposed, in a left-right direction.

21. The optical module of claim 17, wherein the display unit holder fixing part is formed in the lens holder so that a vertical line passing through a center of a region where the optical element is disposed coincides with a vertical line passing through a center of the display unit holder fixing part.

22. A binocular optical module comprising:

an optical module for a left eye and an optical module for a right eye each composed of the optical module of claim 17; and an edge part configured to fix the optical module for the left eye and the optical module for the right eye.

23. The binocular optical module of claim 22, wherein each of the display unit holder fixing parts is disposed in a corresponding one of the lens holders such that a vertical line passing through a center of the display unit holder fixing part is located inward from a vertical line passing through a center of a region where a corresponding one of the optical elements is disposed.

24. A glasses-type augmented reality provision device comprising:

the optical module of claim 17;

a frame part configured to fix the optical modules; and fixation parts configured to be coupled to the frame part and fix the glasses-type augmented reality provision device so that the glasses-type augmented reality provision device can be worn on a face of the user.

25. A glasses-type augmented reality provision device comprising:

the binocular optical module of claim 22;

a frame part configured to fix the binocular optical module; and fixation parts configured to be coupled to the frame part and fix the glasses-type augmented reality provision device so that the glasses-type augmented reality provision device can be worn on a face of the user.

\* \* \* \* \*